United States Patent [19]

Negishi

[11] 4,323,143

[45] Apr. 6, 1982

[54] AUTOMATIC GAP ADJUSTING DEVICE FOR DISC BRAKE INCORPORATING MECHANICAL BRAKE MECHANISM

[75] Inventor: Akio Negishi, Hanyu, Japan

[73] Assignee: Akebono Brake Industry Co., Ltd., Tokyo, Japan

[21] Appl. No.: 94,458

[22] Filed: Nov. 15, 1979

[30] Foreign Application Priority Data

Nov. 21, 1978 [JP] Japan ................................ 53-143834
Nov. 21, 1978 [JP] Japan ................................ 53-143835

[51] Int. Cl.³ .............................................. F16D 65/56
[52] U.S. Cl. ................................ 188/71.9; 188/196 BA
[58] Field of Search ............ 188/71.9, 196 BA, 196 D, 188/196 F

[56] References Cited

U.S. PATENT DOCUMENTS

| | | | |
|---|---|---|---|
| 3,155,195 | 11/1964 | Brawerman | 188/71.9 |
| 3,765,513 | 10/1973 | Brooks | 188/71.9 |
| 3,783,984 | 1/1974 | Knapp | 188/71.9 |
| 3,983,975 | 10/1976 | Wright | 188/71.9 |
| 3,999,638 | 12/1976 | Margetts | 188/71.9 |
| 4,167,989 | 9/1979 | Meyer | 188/71.9 |
| 4,180,146 | 12/1979 | Airheart | 188/71.9 |

FOREIGN PATENT DOCUMENTS

971799  10/1964  United Kingdom ............... 188/71.9

Primary Examiner—Joseph F. Peters, Jr.
Assistant Examiner—John A. Carroll
Attorney, Agent, or Firm—Toren, McGeady & Stanger

[57] ABSTRACT

An automatic gap adjusting device for a disc brake incorporating a mechanical brake mechanism. A recessed part is formed in the face of a hydraulic operating piston on which a sleeve nut 6 screwed to a spindle to be driven by an external force is arranged to abut. The recessed part is provided with a circumferential guide face. The face of the sleeve nut which is abutting on the piston is provided with a stepped protrudent part having its diameter slightly smaller than the inner diameter of the circumferential guide face of the recessed part. The movement of the sleeve nut in the axial direction of the piston is guided by fitting engagement between the guide face of the recessed part of the piston and the protrudent part of the sleeve nut to prevent the sleeve nut from tilting relative to the axis of the piston 3 by the fitting engagement to maintain a normal brake clearance.

2 Claims, 4 Drawing Figures

AUTOMATIC GAP ADJUSTING DEVICE FOR DISC BRAKE INCORPORATING MECHANICAL BRAKE MECHANISM

BACKGROUND OF THE INVENTION

1. Field of the Invention

This invention relates to an automatic gap adjusting device for a disc brake incorporating therein a mechanical brake mechanism.

2. Description of the Prior Art

In the conventional device of this type, as shown in FIG. 1 of the accompanying drawings, a spindle 5 which can be moved forward to a disc rotor 2 by an external force exerted by a parking lever or the like is disposed within a cylinder 4 containing a hydraulic operating piston 3 which is arranged to push a friction pad 1 against the rotor 2 for brake application. During service brake application which is effected by hydraulic pressure, only the piston 3 is allowed to move forward toward the rotor 2 while the spindle 5 is kept stationary. The wear of the lining of the friction pad 1 is taken as increase in the extent of relative displacement between the piston 3 and the spindle 5 to use it for redetermining the returned reposing position of the piston 3 (a gap adjusting action) and, at the time of parking brake application, an external force is exerted to move the spindle 5 together with the piston 3. The conventional gap adjusting mechanism is arranged as follows: A sleeve nut 6 is screwed to a multiple thread screw part 5a of the fore end of the spindle 5. When the extent of the forward movement stroke of the piston 3 caused by hydraulic pressure during service brake application comes to exceed the extent of the movable play (corresponding to a gap between the friction pad 1 and the disc rotor 2) provided for allowing a bearing 8 interposed in between the sleeve nut 6 and a stopper screwed to the piston 3 to move in the axial direction of the piston 3, the sleeve nut 6 is arranged to rotate on the screw to follow the piston 3. The inward screwing rotation of the sleeve nut 6 is arranged to be restricted by a clutch spring 9 which has its winding part 9a wound round the sleeve nut 6 and its one end inserted in a blind hole 3a provided in an inner face of the piston 3 in the axial direction of the piston. The sleeve nut 6 is thus arranged to screw outwardly according as the extent of the forward movement stroke of the piston 3 increases as a result of the wear of the lining of the friction pad 1. The returned reposing position of the piston 3 is thus gradually redetermined relative to the disc rotor 2 with the fore end of the sleeve nut 6 allowed to abut upon an inner face of the piston 3.

With the conventional device arranged as described in the foregoing, when the sleeve nut 6 tilts relative to the axis of the piston 3, the above stated extent of movable play provided for the bearing 8 in the axial direction of the piston becomes less than a setting value thereof. With the movable play of the bearing 8 decreased in this manner, the returning extent of the piston 3 to a brake releasing position becomes less than a normal extent. Such an insufficient returning movement of the piston 3 has been causing the trouble of so-called "dragging" with the friction pad 1 remaining in contact with the disc rotor 2 under a brake releasing condition. Further, when the sleeve nut 6 tilts, a contact area between the piston 3 and the sleeve nut 6 decreases and a frictional force between them becomes insufficient. Then, during parking brake application under such a condition, an excessive force is exerted on the clutch spring 9. This necessitates the clutch spring 9 to have a great strength.

SUMMARY OF THE INVENTION

It is a general object of this invention to provide an improvement over the conventional automatic gap adjusting device in which the above stated shortcomings of the conventional device are eliminated by preventing the sleeve nut from tilting relative to the axis of the piston to maintain a normal brake clearance and also to prevent the contact area between the sleeve nut and the piston from decreasing to maintain sufficient frictional force between them so that a satisfactory operation can be performed with a relatively small restraining force of the clutch spring.

The above and further objects, features and advantages of the invention will become apparent from the following description of embodiments thereof taken in connection with the accompanying drawings.

DETAILED DESCRIPTION OF PREFERRED EMBODIMENTS

Figure 3:
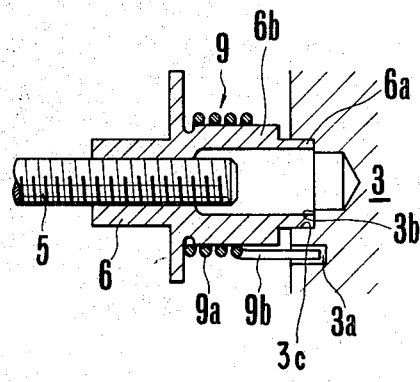
FIG. 3 is a vertical sectional view showing a part of a disc brake as first embodiment example of the invention.

Referring to FIG. 3 which shows the first embodiment example of the invention, a recessed part 3b is formed in the face of a piston 3 on which a sleeve nut 6 is abutting. The recessed part 3b is provided with a circumferential guide face 3c. The face of the sleeve nut 6 abutting on the piston 3 is provided with a stepped protrudent part 6a which has its diameter arranged to be slightly smaller than the inner diameter of the circumferential guide face 3c of the recessed part 3b and also to be smaller than the body 6b of the sleeve nut 6 engaging with the winding part 9a of a clutch spring 9. The movement of the sleeve nut 6 in the axial direction is guided by the fitting engagement of the guide face 3c and the protrudent part 6a. The sleeve nut 6 is prevented from tilting relative to the axis of the piston 3 by this fitting engagement to maintain a normal brake clearance and also to maintain the fore end face of the protrudent part 6a of the sleeve nut 6 in contact with the bottom face of the recessed part 3b of the piston 3, so that decrease in the frictional force between the sleeve nut 6 and the piston 3 can be effectively prevented. In accordance with the arrangement of the invention, a stable rotation restraining force can be obtained for the sleeve nut 6 and, accordingly, a satisfactory operation can be performed without fail with a small restraining force of the clutch spring.

Figure 4:
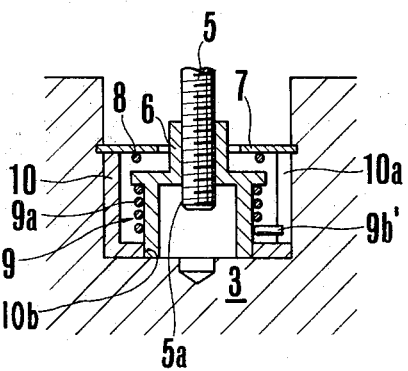
FIG. 4 is a sectional view showing the second embodiment example of the invention.

In FIG. 4 which shows the second embodiment example of the invention, a sleeve guide 10 which is in a tubular shape is secured to an inner circumferential part of a piston 3 and is arranged to be not rotatable relative to the piston 3. One end part 9b' of a clutch spring 9 which is wound round a sleeve nut 6 is arranged to extend in the direction of diameter thereof and is movably inserted in a slot 10a which is formed in the sleeve guide 10 to extend in the axial direction of the piston 3.

Figure 1:
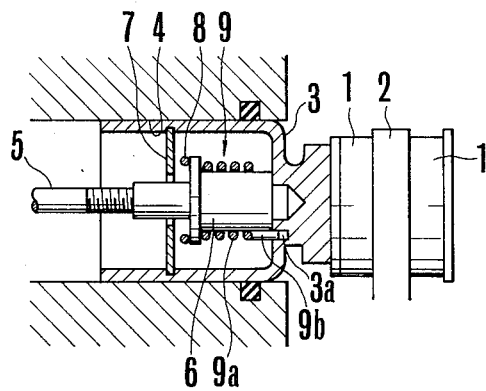
FIG. 1 is a vertical sectional view showing by way of example a part of a conventional disc brake.
Figure 2:
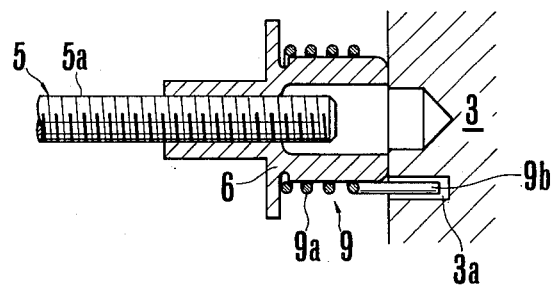
FIG. 2 is an enlarged view showing an essential part of FIG. 1.

In the case of the example of the conventional device shown in FIG. 1, when the end 9b of the clutch spring 9 is tilting relative to the axis of the piston, the sleeve nut 6 tends to tilt with the end 9b of the clutch spring 9 inserted into the hole 3a. Whereas, in the embodiment of the invention shown in FIG. 4, since the end part 9b' is arranged to extend in the direction of diameter, the possibility of having the sleeve nut 6 tilted by the clutch spring is effectively eliminated. Further, in the case of this particular embodiment, a circumferential guide face 10b is provided at one end of the sleeve guide 10 and a sleeve nut 6 is arranged to be in fitted engagement with this circumferential guide face 10b to positively prevent the sleeve nut 6 from tilting.

As described in the foregoing, the invented automatic gap adjusting device for a disc brake incorporating a mechanical brake mechanism effectively prevents the sleeve nut from tilting to ensure higher reliability of the device by the improved, simple structural arrangement thereof.

What is claimed is:

1. An automatic gap adjusting device for a disc incorporating a mechanical brake mechanism said device comprising in combination:
    a hydraulic operating piston arranged to push a friction pad against a disc rotor;
    a spindle arranged to be driven by an external force;
    a sleeve nut which is disposed between said spindle and said piston and is screwed to said spindle;
    a clutch spring arranged to prevent said sleeve nut from making inward screwing rotation;
    a slot formed in fixed relation to said piston to extend in the axial direction of said piston, said slot being arranged to have one end of said clutch spring which extends in the direction of diameter thereof being inserted in said slot, and
    a tubular sleeve guide is secured to the inside of said piston; and said slot is formed in said sleeve guide.

2. An automatic gap adjusting device according to claim 1 wherein said sleeve nut is prevented from tilting relative to the axis of said piston by placing said sleeve nut in fitted engagement with a circumferential guide face provided in said sleeve guide.

* * * * *